(No Model.)
G. G. HUNT.
HARVESTER.
No. 319,257.
Patented June 2, 1885.
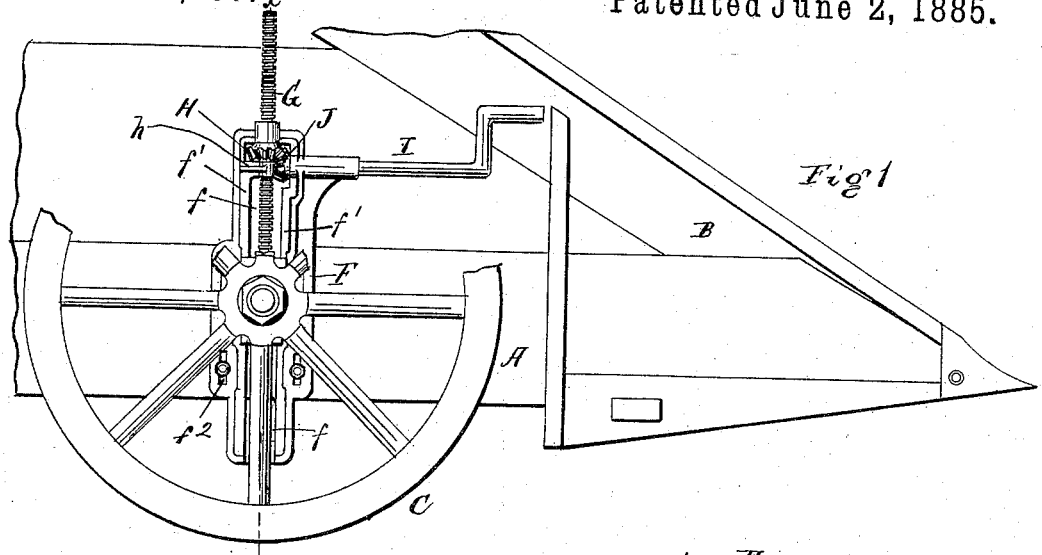
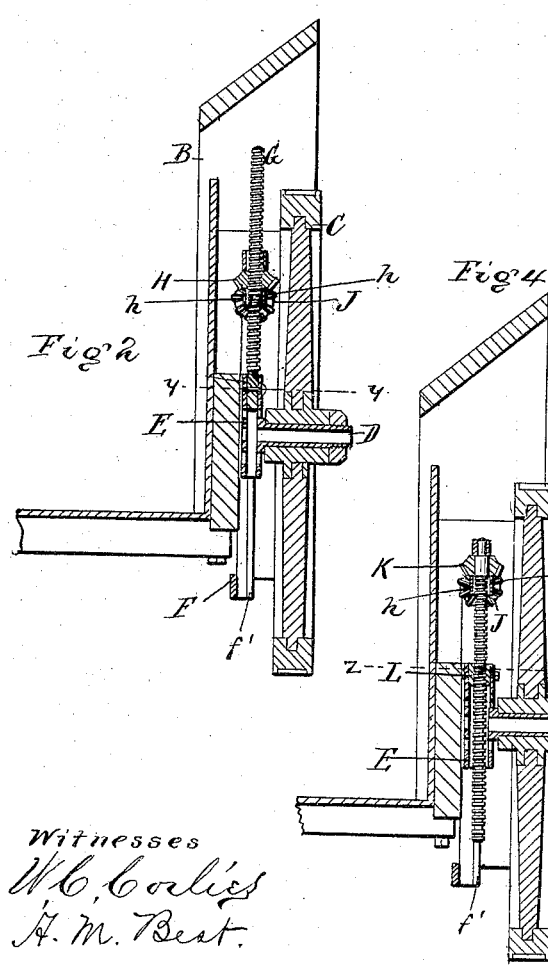
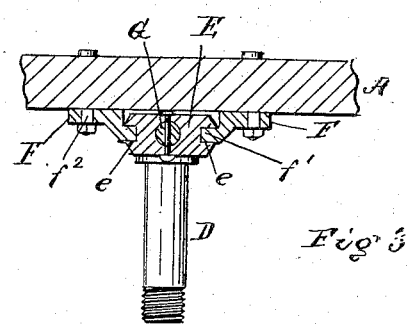
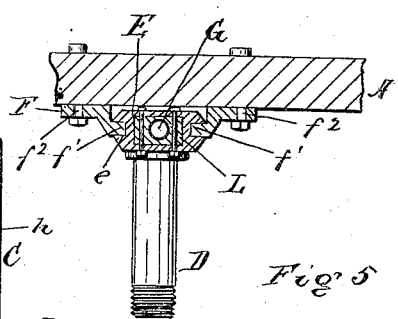
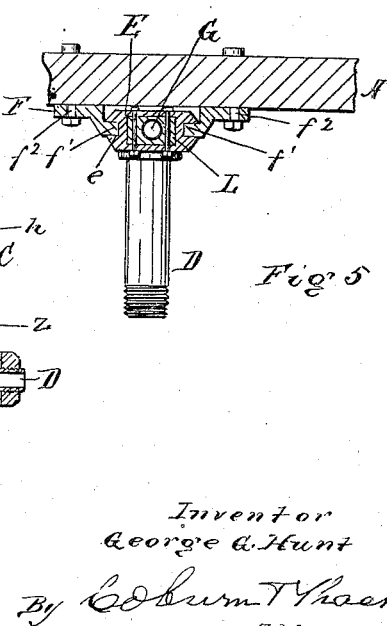
Witnesses
W. C. Corlies
H. M. Best
Inventor
George G. Hunt
By Coburn & Thacher
Attorneys

UNITED STATES PATENT OFFICE.

GEORGE G. HUNT, OF BRISTOL, ASSIGNOR OF ONE-HALF TO THE PLANO MANUFACTURING COMPANY, OF PLANO, ILLINOIS.

HARVESTER.

SPECIFICATION forming part of Letters Patent No. 319,257, dated June 2, 1885.

Application filed June 19, 1884. (No model.)

*To all whom it may concern:*

Be it known that I, GEORGE G. HUNT, a citizen of the United States and residing at Bristol, in the county of Kendall and State of Illinois, have invented certain new and useful Improvements in Harvesters, which are fully set forth in the following specification, reference being had to the accompanying drawings, in which—

Figure 1 represents an end elevation of the outer divider and grain-wheel of a harvester embodying my improvements; Fig. 2, a vertical section of the same, taken on the line $x\ x$, Fig. 1; Fig. 3, a plan section of the same, taken on the line $y\ y$, Fig. 2; Fig. 4, a vertical section taken on the same line as Fig. 2, showing a modification in construction; and Fig. 5, a plan view of the same, taken on the line $z\ z$, Fig. 4.

My present invention relates to mechanism for raising and lowering the grain-wheel of a harvesting-machine. It is well known that in this class of machines it is desirable to make the cutting apparatus and grain-platform adjustable vertically in order to regulate the height of cut to suit different lengths of grain. In making this adjustment the outer end of the platform is raised and lowered by adjusting the grain-wheel vertically; and it is the object of my improvement to provide devices by means of which this can be done quickly and easily.

I will proceed to describe in detail the construction and operation of mechanism by which I have practically carried out my invention in one way, and will then point out definitely in the claim the special improvements which I believe to be new and wish to protect by Letters Patent.

In the drawings, A represents the outer end beam of the platform of the machine, and B the usual outer divider, these parts being of any ordinary construction.

The grain-wheel C is of ordinary construction, and is mounted on a stud-axle, D, which is either fastened to or cast in one piece with a block, E. This axle-block has a groove, $e$, in each of its edges running the entire length thereof, and is mounted in a cast frame or yoke, F, which is secured in an upright position to the beam A, and has a central slot or opening, $f$, running nearly its entire length and open at the lower end to permit the entrance of the axle-block. Ribs or guideways $f'$ are raised on the front of the frame on each side of the central slot, which are adapted to enter the grooves in the axle-block, and thereby attach it to the platform of the harvester, as shown in Figs. 1 and 3 of the drawings. Obviously, as the axle-block is free to slide up and down in the frame, its adjustment in this direction by any suitable devices will raise and lower the grain-wheel with reference to the platform. To accomplish this I provide a screw-threaded rod, G, which is attached at its lower end to the axle-block and extends upward through suitable bearings at the upper end of the frame F, in which it is free to move up and down. A screw-pinion, H, is fitted to this rod and is held from vertical movement between the upper end of the frame and an arm, $h$, projecting inward from one side of the frame, as shown in Fig. 1 of the drawings. A short crank-shaft, I, is mounted in the opposite side of the frame in a horizontal position, and at its inner end carries a pinion, J, which engages with the screw-pinion H. Obviously, the turning of this crank in either direction will rotate the screw-pinion, thereby moving the screw-rod lengthwise in one direction or the other, and so raising and lowering the grain-wheel according to the direction in which the crank is turned.

Any suitable device may be used to fasten the axle-block in any position to which it may be adjusted, either by applying a stop to the crank-shaft or to any other of the movable parts where it is convenient.

The frame F may be provided with slots $f^2$, through which the bolts pass which secure it to the platform-beam, thereby providing for a vertical adjustment, within certain limits, of the frame itself, so as to accommodate its adjustment to different machines.

In Figs. 4 and 5 of the drawings a modification in construction is shown in which the screw-rod is stationary—that is, has no vertical movement—and is provided with an ordinary bevel-pinion, K, with which the pinion on the crank-shaft engages, as already described. A nut, L, is set in the axle-block which receives the screw, and the axle-block is perforated through its length to permit it to work up and down on the screw. Obviously, in this modification whenever the screw-rod is rotated the axle-block will be run up or down thereon, according to the direction in which the screw is rotated. On some accounts this construction is preferable to that first described, as it obviates the running up of the screw-rod to interfere with the grain-board or any other parts of the machine to which it is adjacent.

If the axle-block is of suitable material, the screw-thread may be cut directly therein, instead of having a separate nut set in the block, as shown in Fig. 5 of the drawings.

The relation of the grooves and guideways may be changed, if desired, grooves being made in the frame, and splines or ribs on the axle-block fitting therein. Other changes may also be made in details of construction, and I do not wish to be understood as limiting myself in all particulars to the construction and arrangement of devices herein described and shown.

Having thus described my invention, what I claim as new, and desire to secure by Letters Patent, is—

The grain-wheel, in combination with the axle-block grooved, as described, the yoke-frame F, provided with guide-flanges, the screw-rod supported at its upper end in the yoke-frame, the screw-pinion, and the crank-shaft and pinion, also mounted on the yoke-frame, substantially as and for the purposes set forth.

GEORGE G. HUNT.

Witnesses:
W. C. CORLIES,
THOMAS H. PEASE.